United States Patent [19]

Rosenbaum et al.

[11] 4,092,729

[45] May 30, 1978

[54] APPARATUS FOR AUTOMATICALLY FORMING HYPHENATED WORDS

[75] Inventors: Walter Steven Rosenbaum, Bethesda, Md.; Howard Carl Tanner, Austin, Tex.

[73] Assignee: International Business Machines Corporation, Armonk, N.Y.

[21] Appl. No.: 754,938

[22] Filed: Dec. 28, 1976

[51] Int. Cl.² ............................................. G06F 5/00
[52] U.S. Cl. ................................................. 364/900
[58] Field of Search .................. 364/200, 900; 197/19, 197/20, 84 A; 235/151.22

[56] References Cited

U.S. PATENT DOCUMENTS

| | | | |
|---|---|---|---|
| 3,439,341 | 4/1969 | Dolby | 364/900 |
| 3,537,076 | 10/1970 | Damerau | 364/900 |

*Primary Examiner*—James D. Thomas

*Attorney, Agent, or Firm*—John W. Henderson, Jr.

[57] ABSTRACT

Improved hyphenation apparatus is combined with word verification apparatus to automatically provide hyphenation points for input words from a keyboard or other input device. The spelling of each word input to the system is verified by the digital reference matrix section of the apparatus by calculating a vector magnitude and angle for the word which is compared to the contents of a storage dictionary of words. Each cell of storage in the storage dictionary, in addition to containing a unique angle representation of the input word, contains a byte of data representing the valid hyphenation points for the input word. When an input word is verified to be correctly spelled, the hyphenation byte is read out of dictionary and used by the hyphenation section to reassemble the word in hyphenated form. The hyphenated word is then displayed to the operator for appropriate action.

9 Claims, 4 Drawing Figures

APPARATUS FOR AUTOMATICALLY FORMING HYPHENATED WORDS

BACKGROUND OF THE INVENTION

1. Field of the Invention

The invention disclosed herein relates to data processing devices and more particularly relates to post processing devices for keyboards and other data input devices.

2. Description of the Prior Art

One of the problems that adversely affects throughput in a word processing system where line end justification is required is the problem of how to hyphenate words that occur at the end of a printing line without adequate remaining space to accomodate the word. This problem generally leads to the operator having to stop the machine and manually look up the word in a dictionary.

One technique in the prior art for solving this problem required storing all hyphenated versions of commonly used words in a table and then searching this huge table each time a word is to be hyphenated. Assuming that each word in the table was correctly hyphenated when stored, this technique has the advantage of being accurate in correctly hyphenating each word found in the table. The primary disadvantage of this technique are that the storage requirements and execution time are prohibitively large unless a large scale computer system is used.

SUMMARY OF THE INVENTION

This invention provides an automatic hyphenation system wherein each hyphenatable word in the dictionary is compactly stored in a dictionary memory as a vector. Words from an input device such as a keyboard or character recognition machine are encoded into a vector representation comprising a magnitude and angle as disclosed in U.S. Pat. No. 3,995,254, entitled "Digital Reference Matrix for Word Verification", issued Nov. 30, 1976 to W. S. Rosenbaum, assigned to the instant assignee and hereby expressly incorporated herein by reference. The vector magnitude and angle are used as addresses for a memory containing representations of a plurality of words stored as vectors. Appended to each vector word in the memory which is hyphenatable is an encoded data byte representing placement of hyphenation points within the word. The hyphenation byte is divided into a plurality of subfields each representing the placement of a hyphen within the word. Each subfield has its beginning point marked by the occurrence of a vowel in the word. When a word to be hyphenated has been verified as being spelled correctly by the verification apparatus, the hyphenation byte for the word is accessed. The hyphenation byte is decoded and controls the insertion of hyphens into the word. The hyphenated word is then presented to the operator on a display for appropriate action.

DESCRIPTION OF THE PREFERRED EMBODIMENT

Theory

Figure 1:
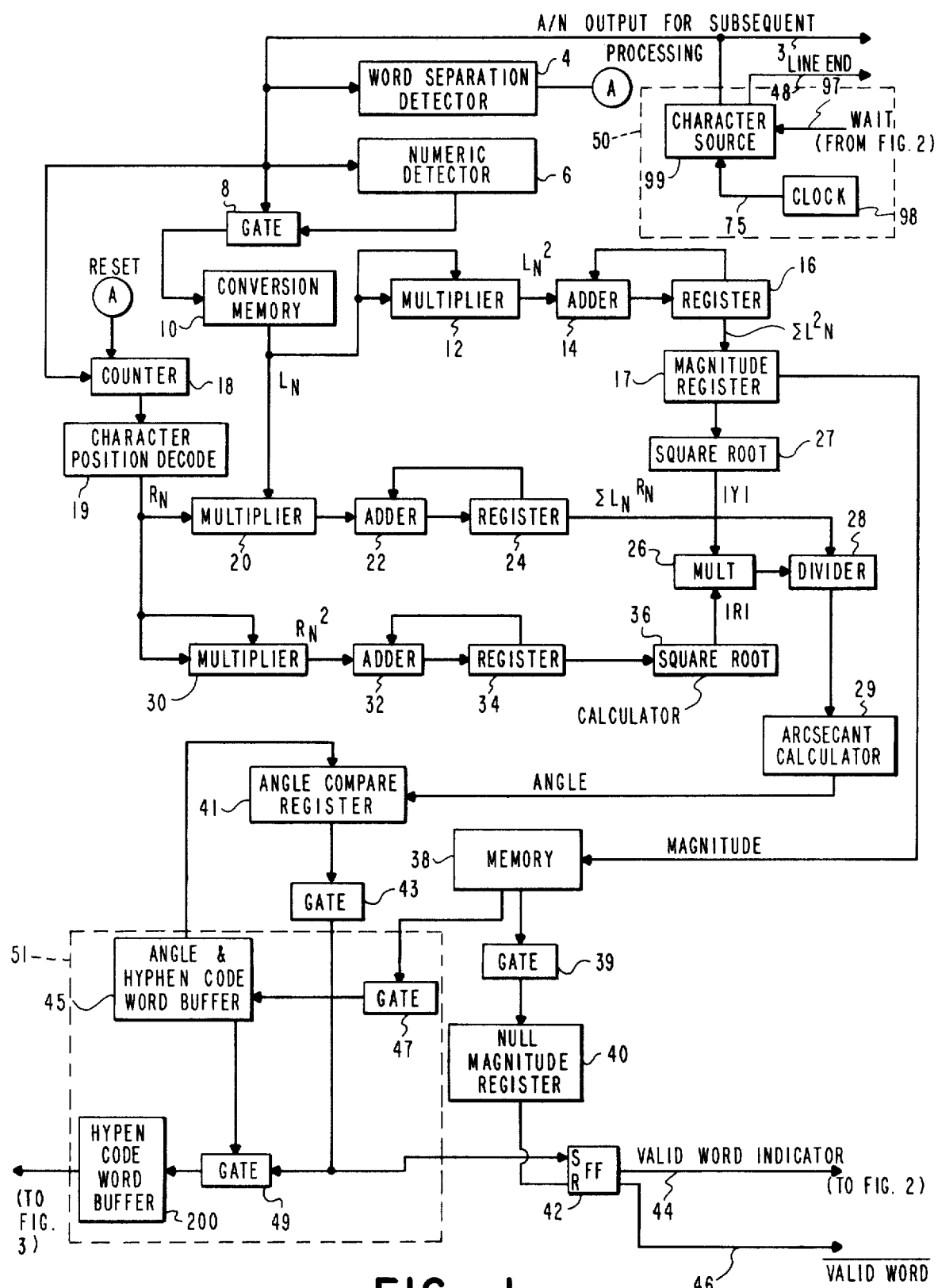
FIG. 1 is a circuit schematic of the verification apparatus of U.S. Pat. No. 3,995,254 modified.

The theory underlying the digital reference matrix (DRM) for word verification is fully disclosed in previously referenced U.S. Pat. No. 3,995,254, and will not be elaborated herein. The DRM relies on a vector magnitude and an absolutely unique vector angle representation for compactly representing a plurality of alpha words in a dictionary memory. Each letter in the alphabet and each position in a word is assigned a numerical value. The vector magnitude and absolutely unique vector angle for a given word is calculated based on the character and position assignments. The vector magnitude serves as an address in the dictionary memory at which the angle for the word is stored. While a plurality of words may have the same magnitude, no two words have the same angle and therefore a single magnitude might have a plurality of angles stored at its address. In operation, the magnitude for the word under consideration is calculated and the memory is searched at the address corresponding to that magnitude for an angle which corresponds to the angle calculated for the word. If the angle is found then the word under consideration is determined to be correctly spelled.

This invention builds on the above described concept by adding an automatic hyphenation capability. The hyphenation capability is realized by combining a hyphenation byte with each angle representation for the word stored in the dictionary memory, see Table 1.

TABLE 1

| OCCUPIED MAGNITUDE | LEGAL ANGLE/HYPHEN CODE WORD | | | |
|---|---|---|---|---|
| 10 | 21.83°/H | 35.04°/H | 42.53°/H | 73.81°/H |
| 17 | 88°/H | | | |
| . | . | . | | |
| . | . | . | | |
| . | . | . | | |
| 256 | 62.41°/H | 89.88°/H | | |

A hyphen code word is generated for each word stored in the dictionary and prestored in the digital reference matrix. In the preferred embodiment, the hyphen code word has been defined as an eight bit byte consisting of four fields of two bits each. Each field defines the placement of a hyphen in the word. The start of a field is defined by a vowel in the word and field is up to three letters in length. The two bits for the field then will represent binary zero through three indicating no hyphen in the field, a hyphen after the first character in the field, a hyphen after the second character in the field, or a hyphen after the third character in the field. Vowels within the field are ignored for purposes of orienting the beginning point for other subfields in the code word hyphen. If a hyphen is allowable in a field, but its displacement from the vowel is greater than three characters, that subfield must be coded (00) as if a hyphen were not allowable. For example, consider the word miscellaneousness. The fourth field in that word consists of the letters eous-n. Since the hyphen occurs more than three letters from the beginning of the field, this field must be coded (00).

Table 2 shows a list of words with their corresponding dictionary hyphenation points and the binary hyphenation byte identification of those points. When a word has more than four hyphenation points, the additional hyphenation points will be ignored and the system will skip to the end of the word. The rational behind this is that the occurrence of four hyphenation points within a word should be sufficient to justify most line endings. However, it is recognized that the ability will be increased by making the hyphenation byte longer to encode more fields, or making the subfields larger so that the possible displacement range is increased, or breaking the word into a number of equal length fields and encoding hyphens in each field, or other possible variations on the definition of the hyphenation byte to suit the purpose of the user. It would also be possible to code and process words from the last character in the word toward the beginning of the word if this suited the purpose of the user.

TABLE 2

| WORD | DICTIONARY HYPHENATION | HYPHENATION BYTE | | | |
|---|---|---|---|---|---|
| | | $F_1$ | $F_2$ | $F_3$ | $F_4$ |
| Abate | A-bate | 01 | 00 | 00 | 00 |
| Abdicate | Ab-di-cate | 10 | 01 | 00 | 00 |
| Clip | — | 00 | 00 | 00 | 00 |
| Clodhopper | Clod-hop-per | 10 | 10 | 00 | 00 |
| Colony | Col-o-ny | 10 | 01 | 00 | 00 |
| Colorimeter | Col-or-im-e-ter | 10 | 10 | 10 | 01 |
| Attribute | At-trib-ute | 10 | 10 | 00 | 00 |
| Attributiveness | At-trib-u-tive-ness | 10 | 10 | 01 | 11 |
| Avenue | Av-e-nue | 10 | 01 | 00 | 00 |
| Beatitude | Be-at-i-tude | 01 | 10 | 01 | 00 |
| Beekeeper | Bee-keep-er | 10 | 11 | 00 | 00 |
| Superconductivity | Su-per-con-duc-tiv-i-ty | 01 | 10 | 10 | 10 |
| Superintendency | Su-per-in-ten-den-cy | 01 | 10 | 10 | 10 |
| Miscellaneousness | Mis-cel-la-neous-ness | 10 | 10 | 01 | 00 |

DESCRIPTION OF THE APPARATUS

Referring to FIG. 1 there is shown a character source 99 whose output is connected to the input bus of the word verification apparatus disclosed in previously referenced U.S. Pat. No. 3,995,254. The character source may be either a standard typewriter keyboard, a magnetic tape or card reader, a suitable character recognition device or other input device. Characters are produced by the character source in synchronism with a clock signal on line 75 from clock generator 98. The character source 99 and clock 98 are enclosed in dashed enclosure 50, and gate 47, gate 49, angle and hyphen code word buffer 45, and hyphen code word buffer 200 are enclosed in dashed enclosure 51 to distinguish the modification to the verification apparatus of U.S. Pat. No. 3,995,254. During the verification phase, the characters generated by the character source 99 are impressed along line 3 in FIG. 1 through gate 8 and into conversion memory 10. The characters also trigger counter 18 which counts the position of each character in a word that is produced. Data bus 3 is also connected to the input of input shift register 300 shown in FIG. 2. Each time a character is presented during the verification phase, it is shifted into the input shift register block 300 upon the occurrence of pulse from AND gate 401 generated by the input terms $\overline{\text{INSERT HYPHEN}}$ and clock 98.

During the word verification phase, which is fully disclosed in the aforementioned U.S. Pat. No. 3,995,254, the characters of the word are assembled in conversion memory 10 and multiplier 12, adder 14, and register 16 generate a vector magnitude for the word which is stored in magnitude register 17 and used as an address into memory 38. The output of the conversion memory 10 also feeds into multiplier 20 along with the unique character position code from character position decode 19. The sum of the product of the character codes from conversion memory 10 and the character position codes from character position decode 19 is accumulated by adder 22 in register 24. Also, the square of the character position decodes is produced in multiplier 30 and the sum of the squares is accumulated in register 34 by adder 32. These sums to into square root calculators 27 and 36, multiplier 26 and divider 28 to produce the secant of an angle for the input word in accordance with the theory disclosed in U.S. Pat. No. 3,995,254. The secant on divider 28 is passed into arcsecant calculator 29 where it is converted to a unique angle for each word.

Memory 38 contains at each magnitude address the angle for each dictionary word defined by that magnitude together with the hyphenation byte representing the dictionary hyphenation points for the word as shown in Table 1. If the magnitude is not found in the memory 38, then gate 39 sets null magnitude register 40 so indicating which triggers flip-flop 42 to produce the $\overline{\text{VALID WORD}}$ signal on line 46. The $\overline{\text{VALID WORD}}$ signal on line 46 may then be used to signal the operator that the word just keyed is incorrectly spelled or to store the word in a special error word memory for later consideration. If the magnitude address is found in memory 38 then the corresponding angles together with their hyphenation bytes are gated through gate 47 into angle and hyphenation code word buffer 45. There the angle portion of the data block is compared in angle compare register 41 with the angle just calculated for the word under consideration by arcsecant calculator 29. An equal compare triggers gate 43 to set flip-flop 42 and place a valid word indicator signal on line 44. Also, the hyphenation byte of the corresponding angle is gated by gate 49 into hyphenation code word buffer 200. This concludes the word verification phase.

If at the conclusion of the word verification phase, the valid word indicator on line 44 is set by flip-flop 42 and a line end signal appears on line 48 from character source 99, indicating that the line is within the tolerances set for justification, the conditions are set for the beginning of the hyphenation phase.

Figure 2:
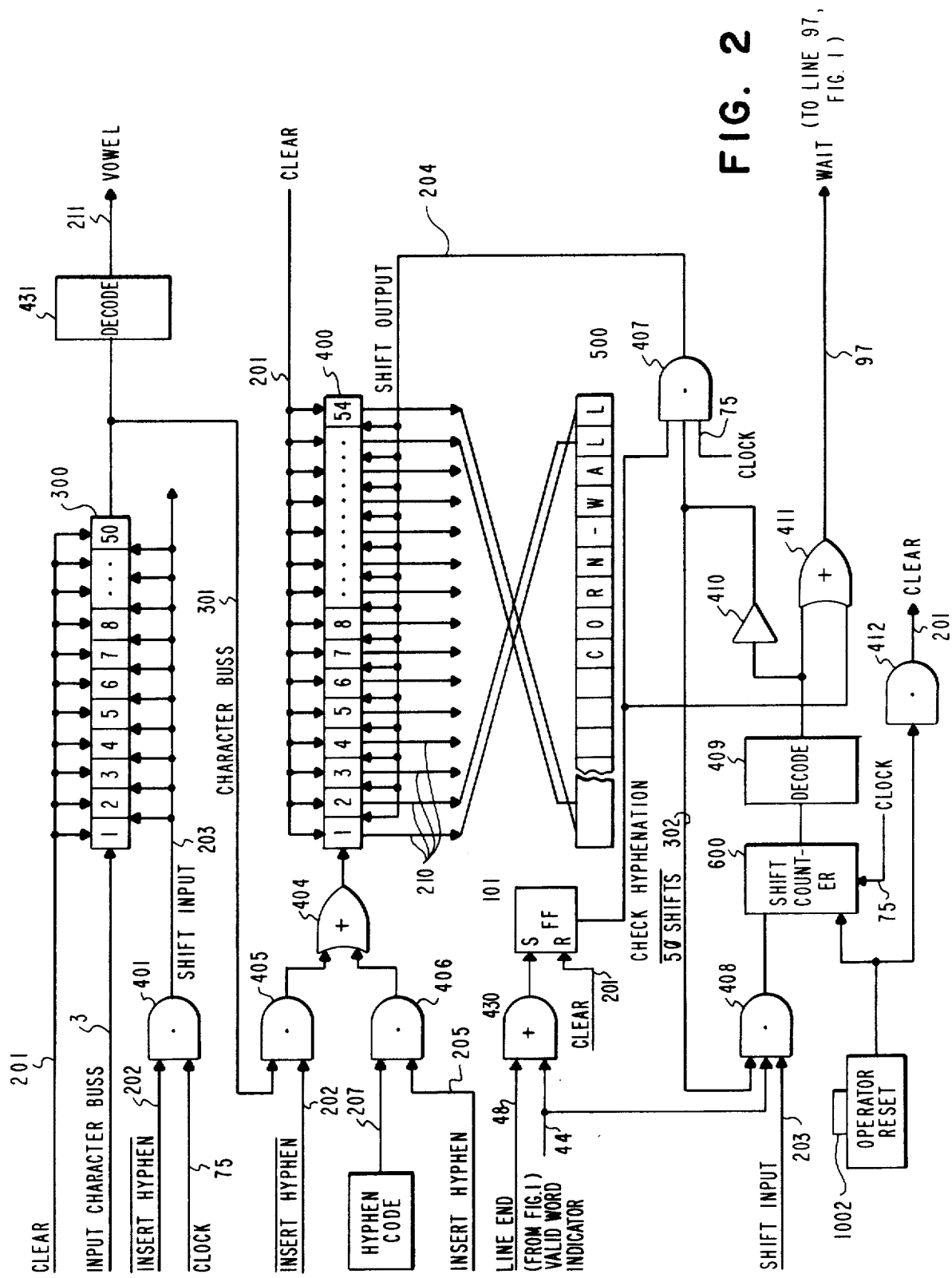
FIGS. 2 and 3 are circuit schematics of the automatic hyphenation apparatus of this invention.

Referring now to FIG. 2, the combination of line end signal 48 and valid word indicator on line 44 satisfy the conditions of AND gate 430 to set flip-flop 101 and output a check hyphenation signal to AND gate 407. Valid word indicator signal on line 44 also feeds into the input of AND gate 408 together with the shift input signal on line 203 from input shift register 300 and a $\overline{50 \text{ SHIFTS}}$ signal 302. The capacity of input shift register 300 is 50 characters. Shift counter 600 which is connected to the output of AND gate 408 counts the number of shifts from input shift register 300 and is used to control the shifting of output shift register 400. The check hyphenation signal causes a series of clock pulses to be fed through AND gate 407 into the shift input of output shift register 400 causing the output shift register to begin shifting on each clock pulse. At the time that the check hyphenation signal comes into AND gate 407, it is also fed to OR gate 411 creating an output called WAIT. This signal is fed to line 97 on FIG. 1 causing the character source 99 not to produce any more characters at this time. The clock signal is ANDED with the signal $\overline{\text{INSERT HYPHEN}}$ at AND gate 401 to produce a shift input signal to the input shift register 300. Thus, the input shift register will shift on each clock signal unless it is inhibited by the signal INSERT HYPHEN. The shift signal on line 203 is also fed to AND gate 408 along with signal $\overline{50 \text{ SHIFTS}}$ and valid word indicator to produce a count up pulse which gates the shift counter 600 to count each clock signal. Decode 409 is connected to the output of shift counter 600 and its output comes high when the value in the shift counter equals 50 and that signal is fed into the inverter 410 to produce the signal $\overline{50 \text{ SHIFTS}}$. The signal $\overline{50 \text{ SHIFTS}}$ is fed back to AND gate 408 to inhibit the count up pulse. The signal $\overline{50 \text{ SHIFTS}}$ is also fed to AND gate 407 to inhibit count pulses to the output shift register after the input shift register has been shifted 50 times. The true signal 50 SHIFTS is fed to OR gate 411 to produce the signal WAIT which is fed back along line 97 to character source 91 on FIG. 1 for the purpose of holding the system. It can be seen, therefore, that the shift counter 600 is used for the purpose of counting shift pulses to the input shift register 300 and that as soon as 50 shifts have been accomplished the shifting of the output shift register 400 will stop, thereby holding the data in output shift register. It can be seen further that the outputs of the output shift register 400 are connected to the display 500 for the purpose of operator review. After the operator has reviewed the word, systems operations may be restarted by depressing the operator reset button 1002 which provides a reset pulse to the shift counter 600 and provides an input to AND gate 412 for generating a clear signal which is applied back to the clear inputs to the input shift register 300 and the output shift register 400 and the reset line to flip-flop 101 for the purpose of establishing initial conditions for the beginning of the next cycle.

Assume now that the hyphenation process is started, the check hyphenation latch is set and shift pulses are being gated to the output shift register 400 through AND gate 407. Also, shift pulses are being gated to the input shift register through AND gate 401. In most probability, the word contained in the input shift register 300 is less than 50 characters long. With each clock pulse at 401 the word in input shift register 300 is moved one character cell to the right and no other control action occurs. Eventually, this word will appear at the right edge of the input shift register 300, the first character first. The null characters, which were in input shift register 300 to the right of the word, shift out along character bus 301 to AND gate 405 and into OR gate 404 back to the input of the output shift register 400. At this time, the signal $\overline{\text{INSERT HYPHEN}}$ is true at AND gate 405 and therefore the signal INSERT HYPHEN is not true at AND gate 406. Shifting continues until eventually a vowel appears in the right hand position of input shift register 300 causing the vowel signal at the output of decode 403 to come true.

Figure 3:
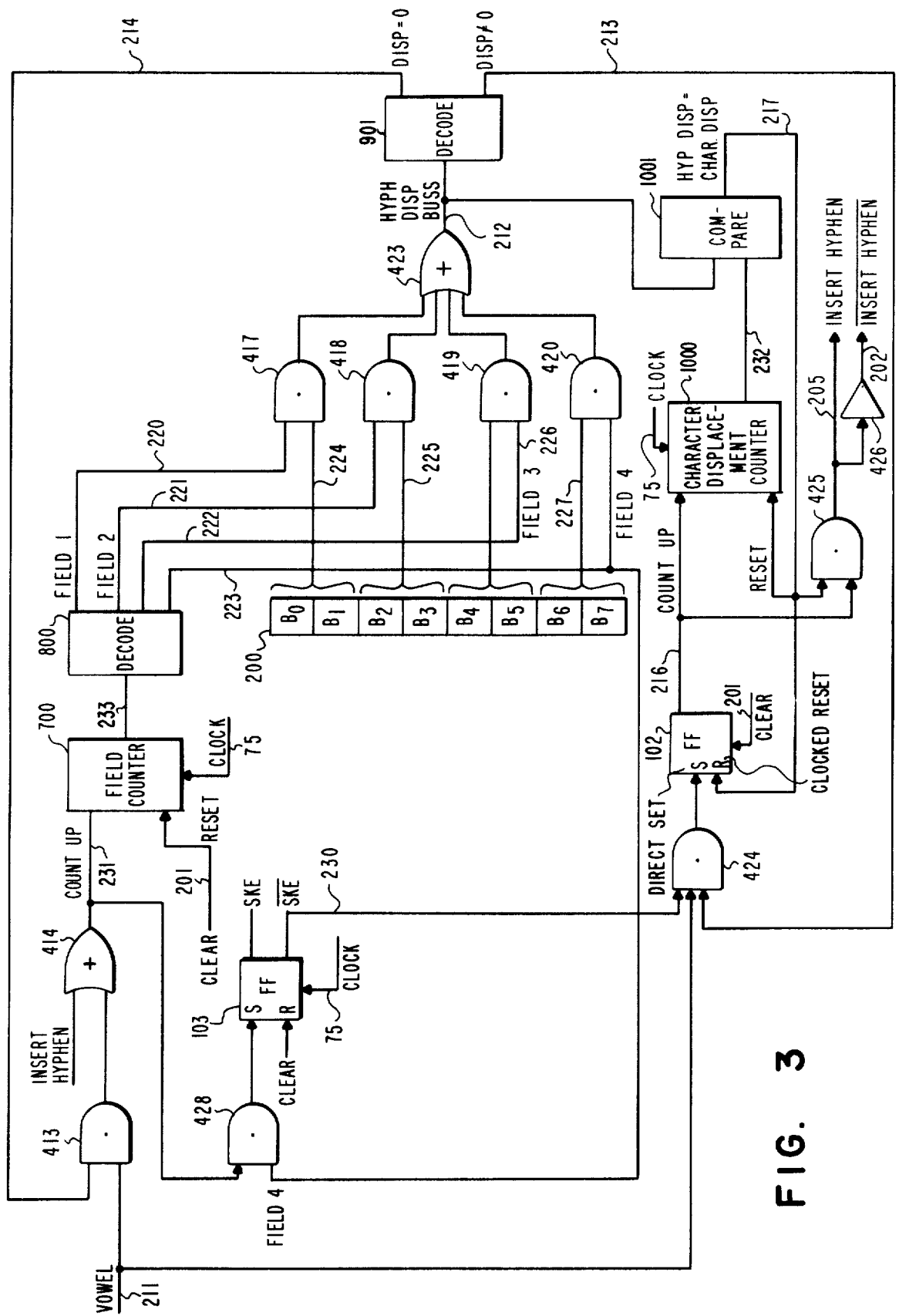

Referring now to FIG. 3, the output of the vowel detector on line 211 is fed into the input of AND gates 413 and 424. AND gate 413 controls the input to field counter 700. The count in field counter 700 determines which of the four two bit data fields in the hyphenation word buffer 200 is under consideration. The counter 700 is in the reset condition having been previously reset and there having been no count pulses yet applied to it. The decode block 800 decodes the output of field counter 700 to select the proper hyphenation field in the hyphenation code word buffer 200. Since no count has yet been applied to the field counter 700, the decode block 800 provides the signal FIELD ONE in the true condition and the other fields, TWO, THREE and FOUR, in the false condition. At this instant of time, the signal FIELD ONE on line 220 is applied to AND gate 417 causing the first field of the hyphen code word buffer 200 to be gated to OR gate 423 and onto the hyphen displacement bus 212.

Connected to the hyphen displacement bus 212 is a decode circuit 901 having two outputs, one called DISPLACEMENT EQUALS ZERO on line 214 and the second called $\overline{\text{DISPLACEMENT EQUALS ZERO}}$ on line 213. When the displacement does not equal zero, a hyphen may be placed within the active (first) field of the word. This signal along with the signal VOWEL on line 211 and the signal $\overline{\text{SKIP TO END}}$ on line 230 is applied to AND gate 424 for the purpose of causing a set pulse to flip-flop 102. Flip-flop 102 sets providing a signal called COUNT TO HYPHEN on line 216 which is fed through the count up input of binary counter 1000 called CHARACTER DISPLACEMENT COUNTER. Counter 1000 counts on the clock pulse for the purpose of determining where the hyphen is to be inserted into the output shift register 400. The value on the hyphen displacement bus 212 is fed to compare circuit 1001 along with the output of the character displacement counter 1000.

Now shifting continues so that the vowel that was previously at the output of the input shift register 300 is gated through the character bus 301 to AND gate 405 and from there to OR gate 404 and into the input of the output shift register 400. On the next clock pulse, the character following the vowel is gated along the same path, and so on. Also, on each clock pulse the binary counter 1000 counts up because the input COUNT TO HYPHEN on line 216 is high, having been set as previously described. When the count in the binary counter 1000 becomes equal to the count in the active (first) field of the hyphen code word buffer which has been gated on hyphenation displacement bus 212, this will cause a compare output signal called HYPHEN DISPLACEMENT EQUAL CHARACTER DISPLACEMENT on line 217 at the output of compare 1001. This signal is fed to AND gate 425 along with the signal COUNT TO HYPHEN on line 216 to produce a signal called INSERT HYPHEN on line 205. The signal INSERT HYPHEN is also inverted by inverter 426 to produce the signal $\overline{\text{INSERT HYPHEN}}$ on line 202.

Referring back to FIG. 2, the signal INSERT HYPHEN is fed to AND gate 406 which causes a hyphen code to be fed into OR gate 404 for presentation to the input of output shift register 400 on the next clock pulse. At the same time, the inverse signal $\overline{\text{INSERT HYPHEN}}$ into AND gate 401 and AND gate 405 inhibits the shifting of input shift register 300 and inhibits any input from AND gate 405 into OR gate 404. Notice that the shift counter 600 does not count at this time because the shift input on line 203 to AND gate 408 has been inhibited by the low input signals to AND gate 401. In this way, one hyphen has been shifted into the output shift register a number of characters behind the vowel as indicated by the subfield of the hyphen code word buffer 200.

Referring back to FIG. 3, it can be seen that the output HYPHEN DISPLACEMENT EQUALS CHARACTER DISPLACEMENT on line 217 is fed back to binary counter 1000 so that on the occurrence of the next clock pulse, this counter is reset. The output of compare circuit 1001 is also fed back to the clocked reset side of flip-flop 102 so that after the hyphen has been inserted, this flip-flop resets. Now shifting continues with data flowing from the output of shift register 300 along line 301 through AND gate 405 and OR gate 404 to the input of output shift register 400.

At the same instant of time that the hyphen was inserted in the output shift register 400, the signal INSERT HYPHEN was also applied to the input of OR gate 414 for producing a count up pulse to the field counter 700 causing it to advance one count on the following clock pulse. Now the condition FIELD TWO high exists at the output of decode block 800 and the other signals are low. The signal FIELD TWO on line 221 causes the second subfield of the hyphen code word in buffer 200 to be gated through AND gate 418 and OR gate 423 onto the hyphen displacement bus 212.

Now shifting continues until another vowel is detected at the output of the input shift register 300 by the vowel detector 403. Now assume that the value contained in the second subfield of the hyphen code word buffer zero. In this instance the output of the decode block 901 called DISPLACEMENT EQUALS ZERO on line 214 will be high and the other output on line 213 will be low. At this instant in time, a vowel is located in the last stage of the input shift register 300 and the signal DISPLACEMENT EQUALS ZERO on line 214 is high. The AND condition for AND gate 413 is satisfied on the next clock pulse which causes the vowel to shift from input shift register 300 into the output shift register 400. Satisfaction of the condition on AND gate 413 produces an output signal to OR gate 414 which causes field counter 700 to advance to the next field. Notice that flip-flop 102 did not set in this case because the $\overline{\text{DISPLACEMENT EQUAL ZERO}}$ signal on line 213 was not true. The field counter will have advanced to FIELD THREE causing the decode 800 to generate a signal on line 226 to set AND gate 419 to gate the third subfield of the hyphen code word buffer 200 through OR gate 423 onto hyphen displacement bus 212. The operation for handling the last two subfields is the same as was described for the first two subfields.

Still referring to FIG. 3, flip-flop 103 has an output called SKIP TO END (SKE) which is provided to take care of the condition wherein a word has more than four hyphens. Since, in the preferred embodiment we have defined a hyphen code word having a maximum of four fields, we have not provided means to encode hyphenations for more than four fields. Therefore, if enough fields occur in a word such that the field four condition is encountered, the field four signal is applied to AND gate 428. When another count pulse is applied to field counter 700 from source OR gate 414, this same count pulse will be applied to AND gate 428 causing flip-flop 103 to set. The output SKIP TO END goes high and the inverse signal $\overline{\text{SKIP TO END}}$ goes low. The $\overline{\text{SKIP TO END}}$ signal is applied to AND gate 424 to inhibit the setting of flip-flop 102. Notice that the SKIP TO END flip-flop 103 will remain set until reset by a clear signal originating at AND gate 412, and further caused by operator depression of the operator reset button 1002. Notice further that the SKIP TO END flip-flop 103 may not set unless there are more than four field within a word. Its only function is to inhibit incorrect hyphenations on words having more fields than can be encoded in the hyphen code word which is stored in buffer 200.

Operation

Figure 4:
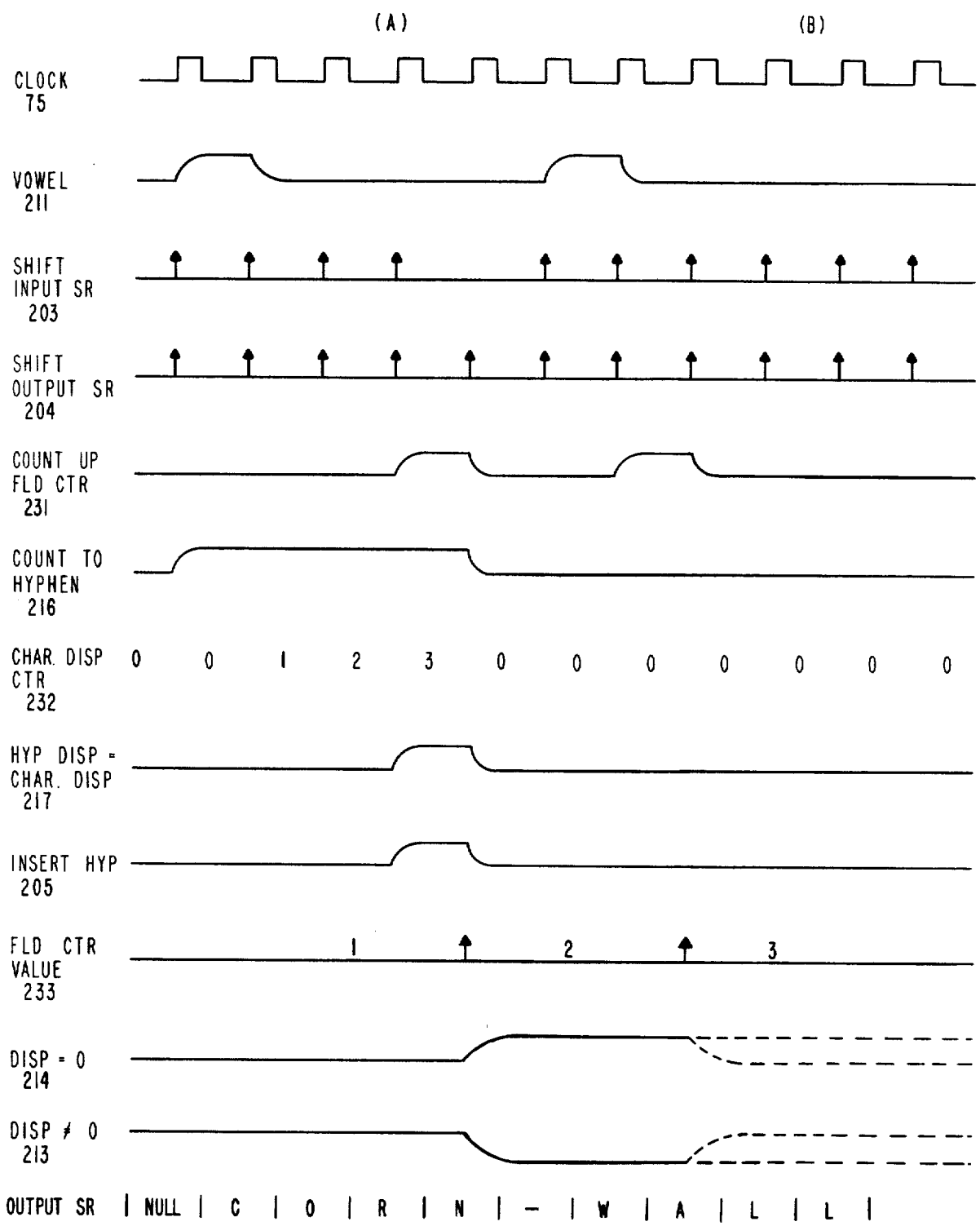
FIG. 4 is a system timing chart for controlling operation of the invention.

Referring now to FIG. 4 the operation of the hyphenation apparatus will be discussed using as an example the word CORNWALL. This word has a single hyphenation point between the characters N and W. The clock pulse on line 75 is free running. Assume that the first character in the word Cornwall, C, is located in position 50 of input shift register 300. On the occurrence of the next clock pulse the C is shifted from input shift register 300 over data bus 301 through AND gate 405 and OR gate 404 into position one of output shift register 400. Also on this shift the second character, O, is shifted into position 50 of the input shift register 300 and sensed by decode 431 to produce the signal VOWEL on line 211. The VOWEL signal on line 211 operates AND gate 424 to set flip-flop 102 and produce a true signal on line 216. At this point the count in the character displacement counter 1000 is zero on line 232 since the counter was reset during the previous operation. On the next clock pulse, the O is shifted from the output of input shift register 300 into the first position of output shift register 400 while the C is shifted into the second position of output shift register 400. The count up input to character displacement counter 1000 is being held high by the setting of flip-flop 102 on the previous pulse. Therefore, this clock pulse causes the counter 1000 to advance to a count of one. Also, since the character in position 50 of input shift register 300 is now a consonant the vowel output on line 211 returns low.

On the third clock pulse the letter R is shifted from position 50 of input shift register 300 into position one of output shift register 400 and the output of character displacement counter 200 is advanced to binary 2 on line 232. The next clock cycle shifts the letter N from position 50 of input shift register 300 into position one of output shift register 400 and brings the count in character displacement counter 1000 to a binary 3. The count in character displacement counter 1000 now compares equal to the output of hyphen displacement bus 212 and signal is raised on line 217 to AND gate 425 to produce a high signal on INSERT HYPHEN line 205 and low signal on $\overline{\text{INSERT HYPHEN}}$ line 202. The high signal on INSERT HYPHEN line 205 controls AND gate 406 to gate a hyphen code into position one of output shift register 400 while the high $\overline{\text{INSERT HYPHEN}}$ code inhibits a signal on line 203 and prevents input shift register 300 from shifting. Also, the high INSERT HYPHEN code feeds into OR gate 414 and produces a high signal on line 231 to cause field counter 700 to advance to FIELD TWO. At this point, input shift register 300 contains in positions 47 – 50 the characters LLAW while output shift register 400 contains in positions 1 – 5 the characters —NROC. The field counter 700 is set at FIELD TWO and the shifting continues.

On the next clock pulse the letter W is shifted from the output of input shift register 300 into the first position of output shift register 400 while the letter A is shifted into position 50 of input shift register 300. The appearance of the letter A in position 50 of input shift register 300 causes vowel decoder 431 to produce an output signal on line 211 to AND gates 413 and 424. At the time when field counter 700 was set to FIELD TWO decode 800 produced a signal on line 221 to AND gate 418 to gate the contents of bits 2 and 3 of hyphenation code word buffer 200 onto hyphen displacement bus 212 to decode 901. This signal was decoded as (00) indicating that no hyphen occurs in this field. Therefore, line 214 was set high and line 213 to AND gate 424 was set low. The occurrence of the VOWEL signal on line 211 to AND gate 413 causes a signal at the input of OR gate 414 whose output on line 231 causes field counter 700 to count up to FIELD THREE on the occurrence of the next clock pulse. Since the displacement not equal zero signal was low on line 213 AND gate 424 does not set flip-flop 102 and therefore the character displacement counter 1000 is not advanced.

On the next two clock pulses, the L's are shifted from the output of input shift register 300 into the input of output shift register 400 and the hyphenated word is displayed on display 500 as shown in FIG. 2.

While the invention has been particularly shown and described with reference to the preferred embodiment thereof, it would be understood by those skilled in the art that changes in form and detail may be made therein without departing from the spirit and scope of the invention.

We claim:

1. Improved apparatus for automatically hyphenating data segments comprising in combination:
    a source of data segments;
    conversion means connected to said source for encoding each of said data setments;
    storage means containing representations of a dictionary of data segments including representations of the legal hyphenation points for the data segments;
    means connected to said conversion means for calculating an address for each of said encoded data segments;
    accessing means for addressing said storage means at the calculated address;
    means connected to said storage means for receiving the representations of the legal hyphenation points stored at the accessed address for the encoded data segment and operable to modify each said data segment by inserting hyphens in the data segment at the legal hyphenation points.

2. The apparatus of claim 1 wherein said means for receiving further includes means for decoding the representations of the legal hyphenation points and means responsive to said decoding means for inserting hyphens into the data segment.

3. The apparatus of claim 2 wherein said means for receiving further includes means for displaying a visual output of the hyphenated data segment.

4. The apparatus of claim 1 wherein said storage means contains vector representations of said data segments.

5. In combination apparatus for verifying the spelling of an input word and automatically hyphenating the word comprising:
    a source of input characters;
    storage means for receiving said input characters;
    means for detecting the end of a word;
    conversion means connected said storage means for converting said word into a vector having a magnitude and an absolutely unique angle;
    memory means containing vector representations of a dictionary of words including representations of the hyphenation points for the words;
    addressing means for accessing said memory means at the address defined by the vector magnitude of the input word;
    comparator means for comparing the vector angle of the input word to vector angles stored in said memory means at said magnitude address;
    means for indicating the word is spelled correctly when the vector angle of the word compares equal to one of the vector angles stored at the vector magnitude address in said memory means;
    means for receiving from said memory means the hyphenation representation associated with the angle that compares equal to the angle of the word to be hyphenated, and operable to hyphenate the word stored in said storage means in accordance with said hyphenation representation.

6. Means for automatically hyphenating an input word comprising:
    a first storage means for receiving the input word to be phyphenated;
    a dictionary memory having prestored therein coded representations of a plurality of words together with a data byte representing the hyphenation points of the word;
    means for converting the input word into a coded representation;
    means for searching said dictionary memory for a coded representation equal to the coded representation of said input word;
    means for accessing the hyphenation data byte found in the dictionary memory associated with the coded representation of the word;
    means for decoding the hyphenation data byte into the legal hyphenation points for the word;
    a asecond storage means;
    means for serially transferring said input word from said first storage means to said second storage means;
    means responsive to said decoding means and serially transferring means for comparing the point in transfer of the word to the decoded legal hyphenation points for the word;
    means responsive to an equal compare for interrupting the transfer of said input word form said first storage means to said second storage means;
    means for inserting a hyphen into said second storage means during each transfer interruption; and
    means for displaying the contents of said second storage means upon completion of the transfer.

7. The means of claim 6 wherein said hyphenation data byte contains a plurality of subfields each representing a hyphenation point for the word.

8. The apparatus of claim 6 wherein each subfield contains a code representing the proximity of the hyphen to a vowel in the word.

9. The method of automatically hyphenating input words comprising the steps of:
    storing the input word to be hyphenated in a first memory means;
    calculating a vector representation of the input word;
    searching a predetermined dictionary memory for an address equal to the vector representation of the input word;
    accessing a data byte from said dictionary memory at the vector address of the input word;
    decoding the data byte into subfields representing hyphenation points for the input word;
    serially transferring the characters of the input word from the first memory means to a second memory means;
    interrupting the transfer of characters in accordance with said decoding;
    inserting a hyphen in said word in said second memory means each time an interrupt occurs; and
    displaying said hyphenated word.

* * * * *

UNITED STATES PATENT OFFICE
CERTIFICATE OF CORRECTION

Patent No. 4,092,729     Dated  May 30, 1978

Inventor(s) Walter S. Rosenbaum et al.

It is certified that error appears in the above-identified patent and that said Letters Patent are hereby corrected as shown below:

Column 10, line 43, "6" should read --- 7 ---.

Signed and Sealed this

Sixteenth Day of January 1979

[SEAL]

Attest:

RUTH C. MASON
*Attesting Officer*

DONALD W. BANNER
*Commissioner of Patents and Trademarks*